W. MINOR.
DRAFT DEVICE.
APPLICATION FILED JAN. 28, 1911.
993,786.
Patented May 30, 1911.
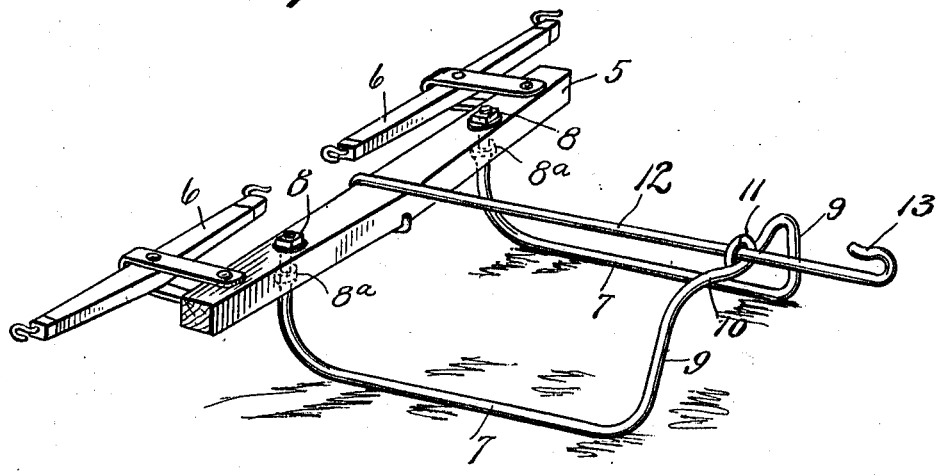
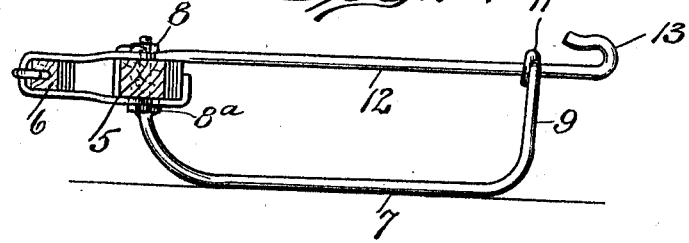
Witnesses:
A. R. Walton
Inventor
William Minor
by
Attys

UNITED STATES PATENT OFFICE.

WILLIAM MINOR, OF FAIRPORT, IOWA, ASSIGNOR OF ONE-THIRD TO CONRAD KOEHLER, OF MUSCATINE, IOWA.

DRAFT DEVICE.

993,786.

Specification of Letters Patent.    Patented May 30, 1911.

Application filed January 28, 1911. Serial No. 605,321.

*To all whom it may concern:*

Be it known that I, WILLIAM MINOR, a citizen of the United States, residing at Fairport, in the county of Muscatine and State of Iowa, have invented certain new and useful Improvements in Draft Devices, of which the following is a specification.

The draft device which is the subject of the present invention is designed more particularly for use in connection with hoisting apparatus, such as hay loaders, pile drivers, etc., operated by draft animals; and it is the object of the invention to provide the draft bar or doubletree, which connects the draft animals to the hauling line, with runners so that it may slide freely over the ground, and also to elevate the same a sufficient distance from the ground so as to prevent the animals from stepping out of their traces.

With these objects in view, the invention consists in a novel construction and arrangement of parts to be hereinafter described and claimed, reference being had to the accompanying drawing forming a part of this specification, in which drawing—

Figure 1 is a perspective view of the invention, and Fig. 2 is a side elevation thereof.

Referring specifically to the drawing, the draft bar or doubletree is shown at 5, the same having connected to its ends swingletrees 6 to which the draft animals are hitched in the ordinary manner. The bar 5 is supported on runners 7, the same comprising a stout rod which passes vertically through the bar and then extends downwardly and rearwardly, in proper spaced relation. The ends of the rod rise a short distance from the top of the draft bar and are screw-threaded to receive nuts 8. Below the draft bar the two ends of the rod have shoulders 8ª which engage the bottom of the draft bar, so that upon tightening the nut 8, the runners are securely fastened to the draft bar. The runners have their rear ends bent upwardly, as indicated at 9, and connected across, the connecting portion 10 being formed midway between its ends with an eye 11. The front ends of the runners are curved so that they may pass freely over obstructions. The bar 5 also carries a draft rod 12 which is connected thereto midway between its ends by being bent around the same. This draft rod extends rearwardly from the bar 5 and passes through the eye 11, its rear end being formed with a hook 13 for connection to the hauling line (not shown).

It will be evident from the foregoing that the runners provide a sliding support for the draft bar and also space the same from the ground, by reason of which the animals can be easily driven, and short turns can be readily made, and at the same time the draft bar is held elevated such a distance from the ground that the animals are effectually prevented from stepping out of their traces.

I claim:

1. The combination with a draft bar, of runners on which the same is mounted, said runners being connected at their rear ends, and the connection having an eye, and a draft rod connected to the draft bar, and passing rearwardly therefrom through the aforesaid eye.

2. The combination with a draft bar, of runners therefor, said runners having their rear ends bent upwardly and connected across, and provided with an eye, and a draft rod connected to the draft bar, said rod being bent around the draft bar, and the rear end of the draft rod passing through the aforesaid eye.

In testimony whereof I affix my signature in presence of two witnesses.

WILLIAM MINOR.

Witnesses:
  ED HENNEKER,
  E. F. RICHMAN.

---

Copies of this patent may be obtained for five cents each, by addressing the "Commissioner of Patents, Washington, D. C."